(12) United States Patent
Chi

(10) Patent No.: US 7,502,634 B2
(45) Date of Patent: *Mar. 10, 2009

(54) HIGH DENSITY INFORMATION PRESENTATION USING SPACE-CONSTRAINED DISPLAY DEVICE

(75) Inventor: Liang-Yu Chi, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/461,328

(22) Filed: Jul. 31, 2006

(65) Prior Publication Data

US 2006/0270462 A1 Nov. 30, 2006

Related U.S. Application Data

(63) Continuation of application No. 09/838,951, filed on Apr. 20, 2001, now Pat. No. 7,092,740.

(51) Int. Cl.
*H04M 1/00* (2006.01)
*H04Q 7/22* (2006.01)

(52) U.S. Cl. ............... 455/566; 455/414.1; 455/414.3

(58) Field of Classification Search ........... 455/566, 455/414, 0.1, 414.3, 550.1, 404.2, 414.2; 345/652, 663, 670, 676, 684

See application file for complete search history.

(56) References Cited

U.S. PATENT DOCUMENTS

| | | | | | |
|---|---|---|---|---|---|
| 6,075,778 | A | * | 6/2000 | Sugita | 370/335 |
| 6,233,432 | B1 | * | 5/2001 | Inukai et al. | 340/7.2 |
| 6,272,332 | B1 | * | 8/2001 | Matsumoto et al. | 455/412.1 |
| 6,297,945 | B1 | * | 10/2001 | Yamamoto | 361/681 |
| 6,347,997 | B1 | * | 2/2002 | Armstrong | 463/37 |
| 6,556,217 | B1 | * | 4/2003 | Makipaa et al. | 345/667 |
| 6,690,394 | B1 | * | 2/2004 | Harui | 715/762 |

* cited by examiner

*Primary Examiner*—Sonny Trinh
(74) *Attorney, Agent, or Firm*—Zagorin O'Brien Graham LLP

(57) ABSTRACT

A high-density information presentation is provided on a space-constrained display device by associating individual display indications with user-definable states. For example, using a portion of a space-constrained display of a mobile phone, pager personal digital assistant, or other portable device, one or more external states may be presented as a simple graphical or character indication that corresponds, in a user-defined way, to the external state or states. In general, implementations allow monitoring and access of a large amount of data on a space-constrained display device. Usability problems associated with traditional systems that split data access and navigation over paged small screens are generally avoided.

17 Claims, 3 Drawing Sheets

HIGH DENSITY INFORMATION PRESENTATION USING SPACE-CONSTRAINED DISPLAY DEVICE

CROSS-REFERENCE TO RELATED APPLICATION(S)

This application is a continuation of U.S. patent application Ser. No. 09/838,951 filed Apr. 20, 2001.

BACKGROUND

1. Field of the Invention

The invention relates to information presentation and, in particular, to devices, systems, and methods for presenting information using a space-constrained display device.

2. Description of the Related Art

In recent years, use of mobile phones, pagers, personal digital assistants (PDAs) and other portable information devices has become pervasive. As use of such devices has increased, so too have the demands for rich information content. While the size, resolution, and flexibility of displays employed by such devices have improved dramatically, space constraints are inevitable. Unfortunately, space constraints limit the richness of information content available to a user. Examples of these limitations can be found in the set of "web-enabled" mobile phones that have begun to enter the marketplace. Typically, such mobile phone interfaces have attempted to squeeze web-oriented presentation paradigms into the comparatively small display screens available given size, weight, power, and other design constraints. The display paradigms employed have typically been based on text-based links and sparse graphics that attempt to reproduce on the phone, in dramatically scaled down form, the presentation of a typical web page. Unfortunately, the size of such display screens (often as small as 4 lines of text with 15 character width) is wholly inadequate for such displays. These interfaces have been heavily criticized for poor usability and sluggishness.

New display paradigms are needed. In particular, techniques, systems and devices are needed that will allow high-density presentation of information despite the substantial space constraints typical of portable information devices.

SUMMARY

In some embodiments, a portable device is provided that comprises a space-constrained display including a two-dimensional array of display elements suitable for simultaneously presenting multiple visual indications on a portion of it; a communications interface to a telecommunications network coupled to the display that allows the portable device to receive information encoding one or more user-defined external states, and to update respective visual indications based on respective user-defined associations with the external states; and a user interface component that includes instructions executable on the portable device to present on the display a mechanism for specifying a display configuration for presenting one of the visual indications, associating a visual indication on the display with a user-defined external state, and establishing a user-defined operation for monitoring the associated user-defined external state.

In some embodiments, the user interface component also includes instructions executable on the portable device to present a mechanism on the display for updating the first indication on the display according to the first monitored user-defined external state in response to receiving information encoding the state via a telecommunications network. In some embodiments, visual indications may be grouped. Some or all of these groupings may be user-defined.

In other aspects, a method is provided for presenting information on a space-constrained display of a portable device. In some realizations the method includes defining an external state to be monitored, defining an operation to monitor the state, specifying the display configuration, and updating the display to indicate data underlying the monitored state. In some realizations, a visual indication associated with the external state may be designated. Some realizations include locating the designated visual indication on the display. In yet another aspect, a method for presenting information on a space-constrained display may include associating a second indication with the external state to provide a textual description when the designated is selected.

In some embodiments an apparatus includes means for presenting a visual indication on a display device and specifying a display configuration for the presentation of the indication on the device. In some embodiments the apparatus also includes means for associating the visual indication with a user-selected external state, and means for receiving information about the external state and underlying data and updating the visual indication based on that information. In some embodiments the apparatus has a means for presenting a second visual indication associated with the user-selected external state to provide a textual description when the first visual indication is selected at the portable device. In some embodiments the display device includes a two-dimensional array of display elements for simultaneously presenting plural visual indications displaced throughout at least a portion of the display.

It is to be understood that the foregoing is merely a summary of certain aspects of the invention. These and other embodiments will be understood in the context of the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
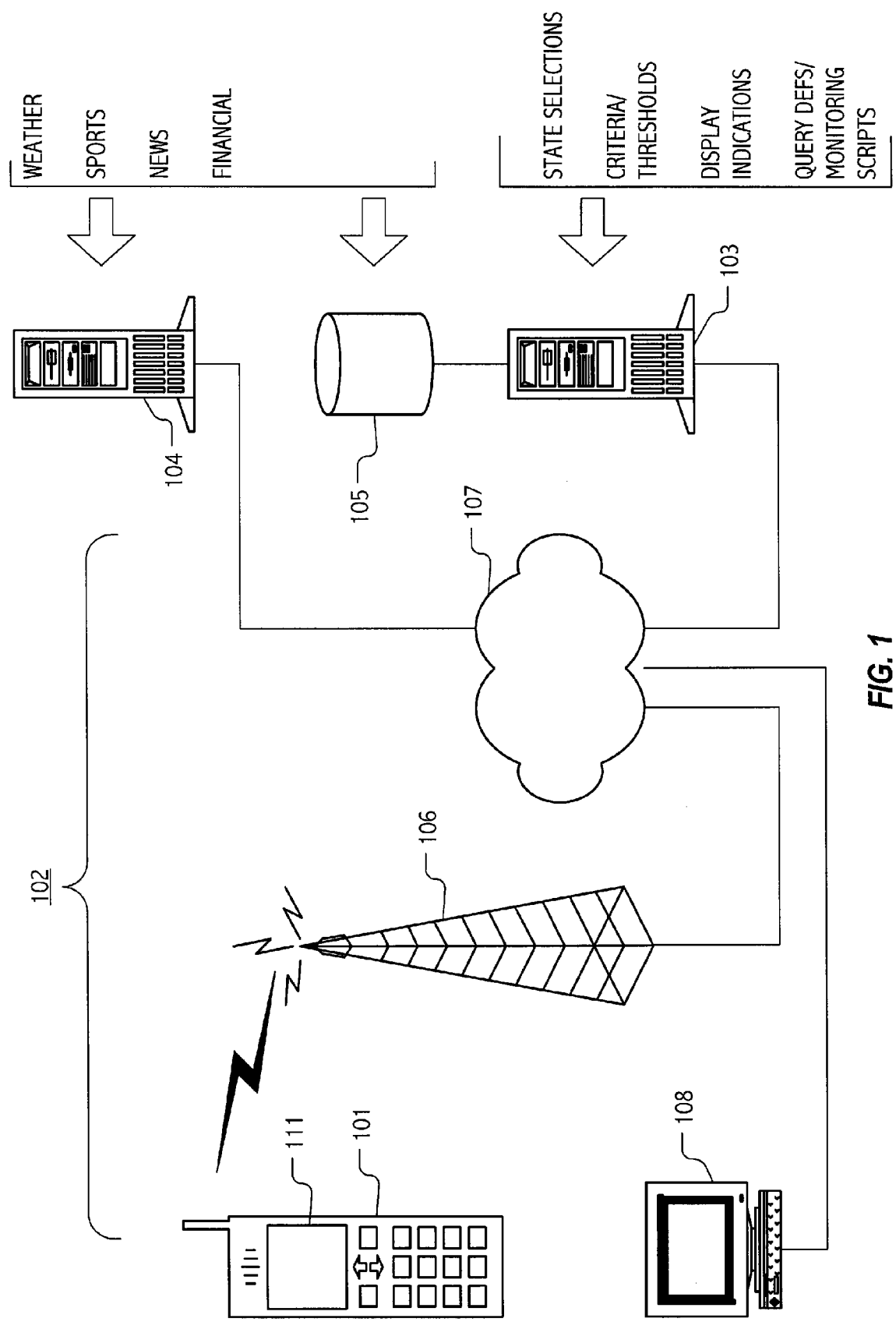
FIG. 1 illustrates a system in which some realizations of the present invention are exploited.

FIG. 1 illustrates a system including exemplary portions of a telecommunications network that facilitate monitoring and dissemination of data to support a high-density presentation of information on a space-constrained display. In the illustration of FIG. 1, portable phone 101 receives (via telecommunications facilities 102, including, in this example, a network 107 and a broadcast tower 106) data that encodes information for presentation on display 111 thereof. The data encodings correspond to states monitored by an information service (e.g., networked server 103) based on user-defined selections, criteria, thresholds, query definitions, etc.

In general, the monitored states are defined in terms of data that may be stored local to the information service (e.g., represented in local storage 105) or that are available from other information services (e.g., networked server 104) accessible to the monitoring information service. Underlying data may concern weather, sports, news, and financial, environmental, personal, or other information. In the illustration of FIG. 1, networked server 103 monitors external states (i.e., states represented external to portable phone 101) in accordance with user selections (e.g., of a particular stock ticker symbol) and/or criteria or thresholds (e.g., less than a particular price).

Depending on the particular implementation, predetermined sets of external states may be provided for selection by a user. Alternatively, user-defined queries or monitoring scripts may be employed to allow greater flexibility. As described more completely below, user-defined associations of particular external states with particular display indications are also provided. In some implementations, access to (and/or definition or selection of) the external states to be monitored, to display associations, and to other configuration information is provided using a browser or other form of user interface. Accordingly, some realizations of networked server 103 include a web server and support HTML interactions such as with a browser hosted at client computer 108. In such a realization, a user may use client computer 108 to access an account preferences page hosted by networked server 103 and thereby configure display options for display 111 of portable phone 101. To facilitate use, such a preferences page may mimic, or otherwise allow the user to preview, the configured display options. In some implementations, a user interface to such configuration information may be provided using facilities provided by the portable phone 101, itself.

Based on a user-defined set of external states and based on the desired display indications, networked server 103 supplies data encodings appropriate for the particular requirements and/or capabilities of telecommunications facilities 102 and the portable phone 101. In general, suitable data encodings will vary from implementation to implementation. However, in some implementations, suitable protocols and encodings are defined in accordance with agreed or de facto industry standards such as the wireless application protocol (WAP), wireless markup language (WML), or Bluetooth wireless technology or in accordance with vendor-specific mobile internet access systems such as iMode (available in Japan from NTT DoCoMo) and cHTML. In general, for implementations in accordance with the present invention, suitable protocols and encodings include any existing or hereafter developed protocols and encodings that allow user-defined indications to be conveyed to a space-constrained display based on a user-defined set of external states monitored by an information service. Persons of ordinary skill in the art will appreciate suitable exploitations of such protocols and encodings based on the description herein.

Figure 2:
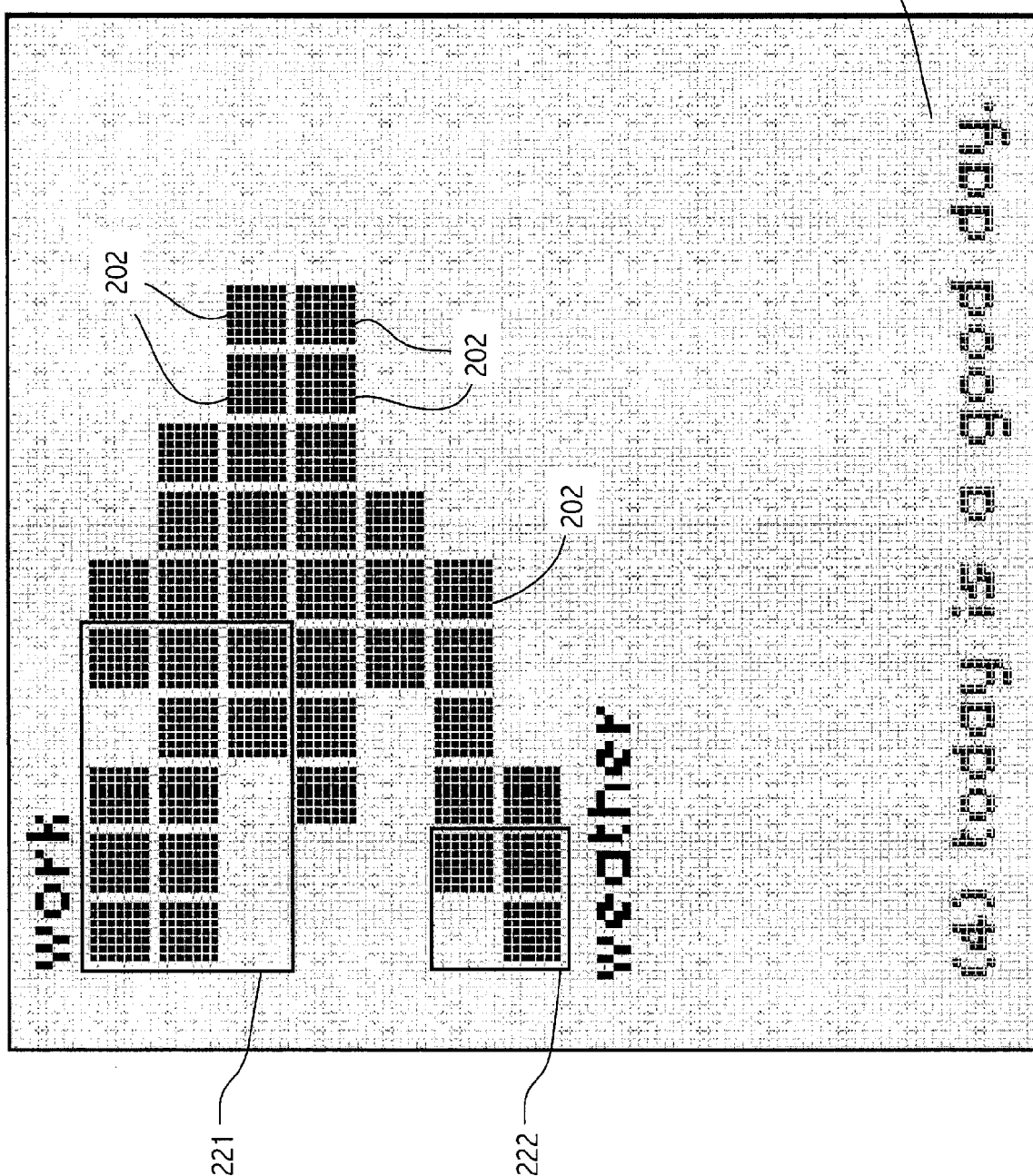
FIG. 2 illustrates a mock-up of a space-constrained display and one display indication configuration in accordance with the present invention.

FIG. 2 illustrates a simple display configuration 211 for a space-constrained display such as display 111 of portable phone 101 (see FIG. 1). The illustrated display configuration allows a user to monitor (and in some realizations, access) a comparatively large amount of information in a constrained display area. For simplicity of illustration, individual display indications 202 are shown as rectangular blocks of pixels that present at least two states (e.g., all on and all off). In the illustration of FIG. 2, the display indications are themselves arrayed in a rectangular grid over at least a portion of display 211. Nonetheless, other display indications and arrangements thereof are also suitable. For example, display indications may be larger or smaller in size and may be defined to present more complex patterns, images, icons, or symbols. Combinations of such patterns, images, icons, or symbols may be employed. In addition, a display indication may exhibit a larger number of states that may be presented as gradations of shade or color, or through use of varying patterns, images, icons, or symbols rendered at approximately the same apparent position on display 211. Distributions of display indications over a display may mimic the rectangular geometry illustrated. Alternatively, other geometries, patterns, or tessellations may be employed.

In view of the above, and without limitation, the description that follows focuses on the illustrated rectangular grid of two-state rectangular-shaped display indications. Nonetheless, based on the description herein, persons of ordinary skill in the art will appreciate suitable variations for other display configurations in which individual display indications are associable with user-defined (i.e., defined or selected) states external to the device incorporating the display.

Focusing then on the illustration of FIG. 2, display indications 202 are arranged in a rectangular grid and each correspond to a reasonably current sample of an external state. The grid presents a user-defined arrangement of the display indications, which visually conveys a variety of external states defined or selected by the user for monitoring. Some examples of external states that might be monitored include:

1. System of information Status. For example, do I have new email from person X? What is the status (armed, disarmed, etc.) of my home burglar alarm system? Have are any of the servers for which I am responsible down?
2. Weather or Environmental Status: For example, is the local pollen count greater than a level that warrants my use of an allergy medication? Has it been more than N days since the last precipitation at a local weather observation station? Do a majority of the local weather forecasts predict at least a 50% chance of rain today?
3. News, Financial or Sports Status: For example, is my favorite sports team playing today? Have any of my stocks on a watch list reached my trigger price?

The set of possible associations between individual display indications 202 and external states is virtually limitless. Depending on the particular implementation, users may be provided a generalized capability to define arbitrary external states and techniques for ascertaining these external states. For example, a generalized scripting facility could be provided. Alternatively, the user-defined set of external states may be selected from amongst predetermined states with corresponding predetermined monitoring techniques. Some implementations may provide both facilities for establishing the user-defined set.

In any case, user-defined external states are associated with particular display indications. While each display indication may be individually associable with a monitored external state, users may wish to (and some implementations may provide facilities to) group like display indications. In this way, display indications corresponding to related external states can be grouped together to convey categorical information, e.g., by grouping in adjacent display indications so that the user can instantly recognize whether any of his contacts have posted information. For instance, in the illustration of FIG. 2, the individual display indications grouped as display indication group 221 may individually correspond to the current up-status of 15 servers for which the portable device user is responsible. Given such a user-defined association, the illustrated display state might indicate that 11 of the 15 servers are currently "up." Similarly, the individual display indications grouped as display indication group 222 may correspond to >20%, >40%, >60%, and >80% chance of rain, respectively. In general, both individual associations and groupings may be user-defined.

In addition to the rectangular grid, a text display line 203 is also provided in the illustrated display configuration. This additional display indication may be employed to augment information conveyed by the previously described grid. For example, on a display device that includes a navigation or selection capability, a user could navigate the grid using directional buttons. In the case of a portable phone or pager, navigation may be provided by a pair of "forward" and "back" or by mapping other buttons to navigation functions (e.g., 2=up, 8=down, 4=left, 6=right). Some devices, e.g., PDAs may employ a stylus. In general, suitable navigation and selection facilities will be device-dependent. Whatever the facility, when a particular one of the display indications 202 is selected from the grid, text display line 203 may be employed to present additional detail. For example, a fixed description of the monitored external state (e.g., "Chance of Rain") or user-defined text (e.g., "Take your Benadryl now") may be presented. In some implementations, the descriptions presented on text display line 203 may correspond to the state presented by the associated display indication (e.g., "Gatekeeper: Status Normal" or "Gatekeeper: Intrusion Detected"). In others, the description may simply identify the external state represented by the associated display indication (e.g., "Server 12 Status").

In some implementations, event notification facilities (e.g., audible, vibrating alert, etc.) may be provided. For example, as monitored events occur (e.g., as the portable device receives encodings that indicate a change of state for a monitored external state), the device may notify the user immediately (for special high-priority events) or, more commonly, accumulate the events. When the user checks the device, the number of events accumulated since last review may be presented, e.g., using the text display line 203, together with the details of the most recent event. In some implementations, the user may navigate through the events using an appropriate navigation/selection facility. For example, up and down navigation buttons on a portable phone may be employed to move from one display indication to the next (or previous) display indication corresponding to an accumulated event. Typically, details presented using text display line 203 are updated in correspondence with such navigation. Optionally, the data grid may further identify (e.g., blink or highlight) the display indication(s) corresponding to each such event. Such identifying behavior may help the user to build meaningful associations between events and their corresponding display indication(s).

Figure 3:
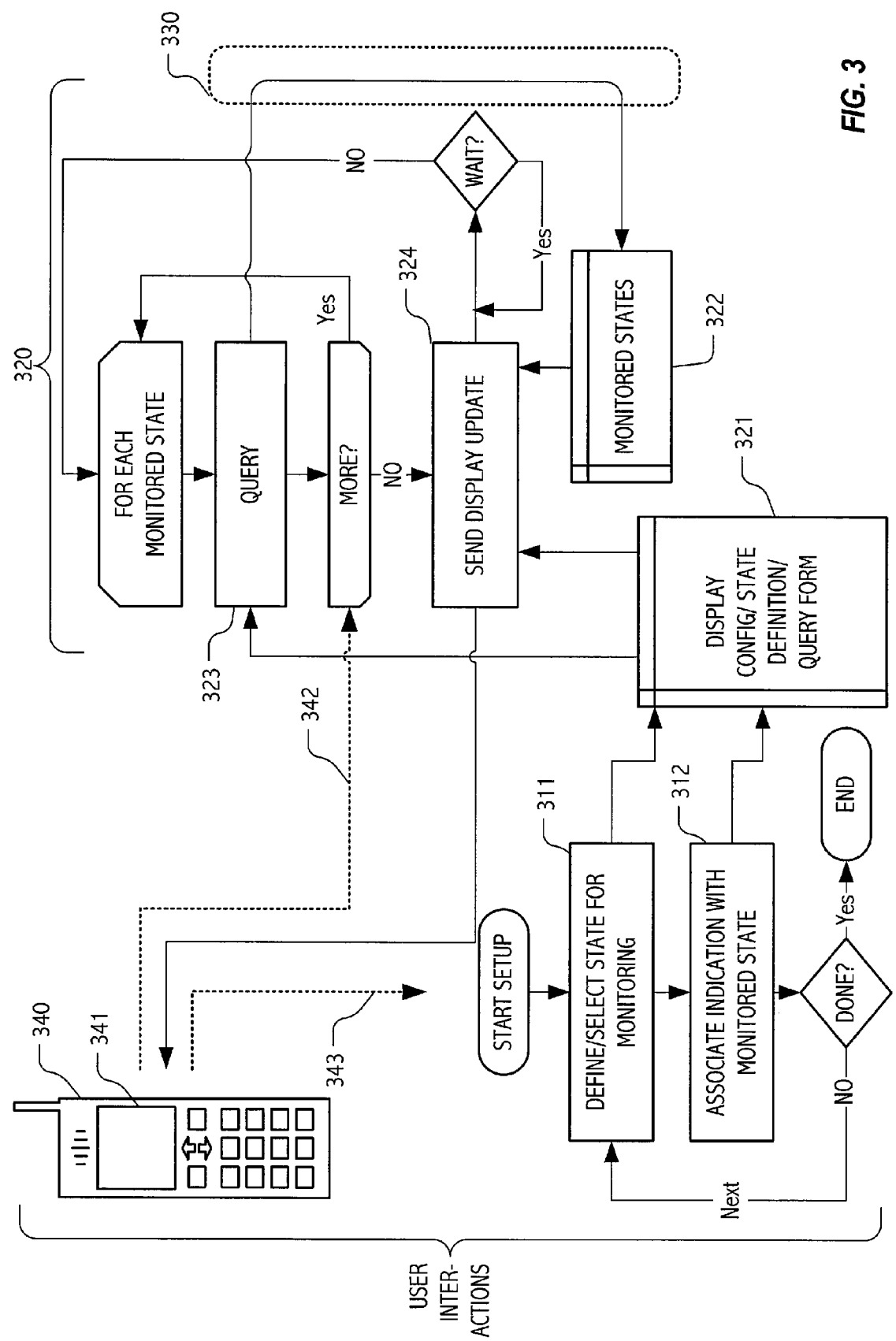
FIG. 3 depicts data and control flows for cooperating components of a realization in accordance with the present invention, which provides a user with a network-resident service for defining monitored states and associated display indications for presentation on a space constrained display.

FIG. 3 depicts data and control flows for cooperating components of an illustrative implementation in which a network-resident service allows user definition of monitored states and associated display indications for presentation on a space constrained display. In general, a user interacts with the network-resident service by defining and/or selecting (311) particular external states for monitoring and by associating (312) particular display indications. As described above, depending on the particular implementation, users may be provided with a generalized capability to define arbitrary external states and techniques for ascertaining those external states, whether represented locally or on a remote information service. For example, a generalized scripting facility or database query facility may be provided. Alternatively, the user-defined set of external states may be selected from amongst predetermined sets of states with corresponding predetermined monitoring techniques. In either case, the user-defined set of external states and associations with particular display indications are represented as display configuration data and made available to a monitoring process or service 320.

In some implementations, user interactions to specify a set of monitored external states and associated display indications are mediated through a networked client computer acting as a user interface (e.g., using browser technology) to configuration data 321 and monitoring process or service 320. In some implementations, user interactions are via (343) the portable device itself. For example, using a simple browser or browser-like facility provided by a portable phone or PDA, the user may specify the monitored external states and associated display indications.

Given a user-specified display configuration, monitoring process or service 320 performs a query, lookup, database access, or other retrieval or information-gathering step (323) to ascertain each monitored state (e.g., from local or remote information sources 330). Retrieved external state information is stored (322) for transmission of a display update (324). As described above, suitable data encodings for transmission are particular to the telecommunications facilities and space-constrained display device employed (e.g., display 341 of portable phone 340). In general, updates can be pushed to portable phone 340 or supplied in response to a request (e.g., 342). In some realizations, updates are periodically supplied. In some realizations, updates are supplied on detection of a change in a monitored state.

In general, implementations such as described herein allow monitoring and accessing of a large amount of data on a constrained display device. Usability problems associated with traditional systems that split data access and navigation over paged small screens are avoided. In addition, overall data density is generally improved. In many realizations, the result is easier access to more data. Notably, encodings of display indications such as described herein can be quite space-efficient. In particular, data encodings of such display indications may be encoded in a few bytes if necessary or desirable. Consequently, the described techniques can facilitate display updates over even low-bandwidth networks.

In contrast with existing text-based linking techniques, which in most practical cases could support no more than 4 links on a screen, some implementations support a dense grid of display indications which could easily support 20 to 50 links in the same space. Such a data grid can be interpreted quickly since it takes advantage the human perceptual ability to process visual aggregations. Realizations that emphasize such aggregations will tend to group display indications for related events. Some realizations may encourage or enforce such aggregations by predefining (e.g., using display templates) certain portions of a display for display indications corresponding to like events. For example, portions of the display may be preallocated to eMail indications, to weather/environmental indications, to financial indications and/or sport- or family-related indications. Such realizations tend to encourage advantageous visual aggregations while still allowing user selection of a preallocation scheme and/or of particular events and display indications within a preallocated display portion.

It should be noted that even though the grid can be interpreted visually, the actual grid elements can be made using characters instead of graphics, making the amount of data needed to process and/or store the state of the display minimal. For example, the state information for a 32-cell data grid could be stored in just 4 bytes (compare this to 2 KB for even the smallest web graphics, or about 64 bytes for text). Consequently, the described techniques may continue to work well even under extremely bandwidth-constrained situations.

While the invention has been described with reference to various embodiments, it will be understood that these embodiments are illustrative and that the scope of the invention is not limited to them. Many variations, modifications, additions, and improvements are possible. Plural instances may be provided for components described herein as a single instance. Boundaries between various components, operations, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A portable device comprising:
   a space-constrained display including a two-dimensional array of display elements suitable for simultaneously presenting plural visual indications displaced throughout at least a portion thereof;
   a communications interface to a telecommunications network, the communications interface coupled to the space-constrained display and allowing the portable device to receive information encoding one or more user-defined external states and to update respective ones of the visual indications based on respective user-defined associations with the external states; and
   a user interface component, including instructions executable on the portable device to present on the space-constrained display a mechanism for specifying a display configuration for presenting a first of the visual indications, associating the first visual indication with a first user-defined external state, and establishing a user-defined operation for monitoring the first user-defined external state.

2. The portable device of claim 1, wherein the user interface component further includes:
   instructions executable on the portable device to present on the space-constrained display a mechanism for updating the first visual indication on the display in accordance with the first monitored user-defined external state in response to an information encoding thereof received via a telecommunications network.

3. The portable device of claim 2, wherein the external states are user-selected and include one or more of weather status, environmental status, system status, information status, and news, sports or financial status.

4. The portable device of claim 2, wherein the plural visual indications are grouped in user-defined groupings.

5. The portable device of claim 2 wherein the telecommunications network includes one or more of a wireless voice network, a wireless data network, a packet-switched data network, an internet or intranet, a local- or wide-area network and a public switched telecommunications network (PSTN).

6. The portable device of claim 2 embodied as one or more of a phone, a personal digital assistant, a pager, a palm- or handheld-computer, a digital media player, a communications-enabled portable device, and a WAP- or Mode-enabled portable device.

7. A method of presenting information on a space-constrained display of a portable device, the method comprising:
   establishing a user-defined external state;
   establishing a user-defined operation for monitoring the user-defined external state;
   establishing a user-specified display configuration; and
   updating the display to indicate data underlying the monitored user-defined external state in response to an information encoding thereof received via a telecommunications network.

8. The method of claim 7, wherein establishing the user-specified display configuration comprises:
   designating a visual indication associated with the user-defined external state.

9. The method of claim 8, wherein establishing the user-specified display configuration further comprises:
   designating a location on the space-constrained display for the designated visual indication.

10. The method of claim 8, further comprising:
    associating a second indication with the user-defined external state, the second indication providing textual description rendered in response to selection, at the portable device, of the designated visual indication.

11. The method of claim 8, further comprising:
    defining a criterion for the data underlying the monitored user-defined external state; and
    in response to a correspondence between the data and the criterion, causing a notification.

12. The method of claim 11, wherein the notification is an audible notification.

13. The method of claim 11, wherein the notification is a vibratory notification.

14. The method of claim 11, wherein the notification is a change in the visual indication.

15. The method of claim 8, further comprising:
    establishing one or more additional user-defined external states;
    establishing respective user-defined operations for monitoring each of the additional user-defined external states;
    specifying respective visual indications associated with each of the additional user-defined external states;
    configuring the display to present the visual indications; and
    updating the display to indicate the data underlying the monitored user-defined external states in response to a corresponding information encoding thereof received via a telecommunications network.

16. An apparatus comprising:
    means for presenting a first visual indication on a display device;
    means for specifying a display configuration for presentation of the first visual indication;
    means for associating, based on a user selection, the first visual indication with a state external to the apparatus; and
    means for receiving an information encoding corresponding to data underlying the external state and for updating the first visual indication based thereon;
    means for ascertaining the data underlying the external state and for communicating the information encoding corresponding thereto;
    means for presenting a second visual indication on a display device;
    means for specifying a display configuration for presentation of the second visual indication; and
    means for associating the second visual indication with the external state, the second indication providing textual description rendered in response to selection, at the portable device, of the first visual indication, the first visual indication comprising a graphical or character indication.

17. The apparatus of claim 16, wherein the display device includes a two-dimensional array of display elements suitable for simultaneously presenting plural visual indications displaced throughout at least a portion thereof, the first visual indication corresponding to at least one of the plural visual indications.

* * * * *

UNITED STATES PATENT AND TRADEMARK OFFICE
CERTIFICATE OF CORRECTION

PATENT NO. : 7,502,634 B2  Page 1 of 1
APPLICATION NO. : 11/461328
DATED : March 10, 2009
INVENTOR(S) : Liang-Yu Chi It is certified that error appears in the above-identified patent and that said Letters Patent is hereby corrected as shown below:

In column 7, claim 6, line 57, please replace "Mode-enabled" with --iMode-enabled--.

Signed and Sealed this

Twenty-first Day of April, 2009

JOHN DOLL
*Acting Director of the United States Patent and Trademark Office*